(12) United States Patent
Foster (10) Patent No.: US 9,394,103 B2
(45) Date of Patent: Jul. 19, 2016

(54) PARTICULATE MATERIAL LOADING APPARATUS FOR TRANSPORT CONTAINERS

(71) Applicant: FWS Technologies Ltd., Winnipeg (CA)

(72) Inventor: Glen Foster, Winnipeg (CA)

(73) Assignee: FWS TECHNOLOGIES LTD., Winnipeg, Manitoba (CA)

( * ) Notice: Subject to any disclaimer, the term of this patent is extended or adjusted under 35 U.S.C. 154(b) by 73 days.

(21) Appl. No.: 14/279,976

(22) Filed: May 16, 2014

(65) Prior Publication Data

US 2015/0071750 A1  Mar. 12, 2015

Related U.S. Application Data

(60) Provisional application No. 61/824,516, filed on May 17, 2013.

(51) Int. Cl.
 *B65D 88/54* (2006.01)
 *B65G 69/04* (2006.01)
 *B65G 69/02* (2006.01)

(52) U.S. Cl.
 CPC ............ *B65D 88/54* (2013.01); *B65G 69/0441* (2013.01); *B65G 69/02* (2013.01)

(58) Field of Classification Search
 CPC .. B65G 11/126; B65G 11/106; B65G 11/146; B65G 11/026; B65G 11/206; B65G 63/008; B65G 63/067; B65G 69/0441; B65G 69/02; B65G 67/606
 USPC ................. 414/397, 299, 303, 333, 334, 335; 193/14, 29
 See application file for complete search history.

(56) References Cited

U.S. PATENT DOCUMENTS

| 232,597 | A | | 9/1880 | Coleman | |
|---|---|---|---|---|---|
| 878,721 | A | * | 2/1908 | Gilman | B65G 11/126 193/16 |
| 3,048,282 | A | * | 8/1962 | Reiff | B65G 67/00 193/29 |
| 3,572,523 | A | | 3/1971 | Cymara | |
| 3,944,090 | A | * | 3/1976 | Flood | B65G 67/04 141/256 |
| 4,040,529 | A | * | 8/1977 | Wurdeman | B65G 69/0441 193/17 |
| 4,397,423 | A | * | 8/1983 | Beaver | B65G 69/0458 193/32 |

(Continued)

FOREIGN PATENT DOCUMENTS

FR          2690676          11/1993

*Primary Examiner* — Kaitlin Joerger
(74) *Attorney, Agent, or Firm* — Ryan W. Dupuis; Kyle R. Satterthwaite; Ade & Company Inc.

(57) ABSTRACT

A loading apparatus assists in loading particulate bulk material into a transport container, for example a railcar having a loading opening in a top side thereof. The loading apparatus is used with a main loading spout extending in a longitudinal direction and having a discharge opening at a bottom end for discharging particulate bulk material therethrough. The loading apparatus has a pair of secondary spouts operatively connected with the main loading spout such that: i) a primary flow of the particulate material is discharged into the transport container downwardly through the discharge opening in the longitudinal direction of the main loading spout; and ii) a secondary flow of the particulate material is discharged into the transport container through said at least one secondary spout in a respective lateral direction transversely to the longitudinal direction of the main loading spout.

19 Claims, 7 Drawing Sheets

(56) References Cited

U.S. PATENT DOCUMENTS

| | | | | |
|---|---|---|---|---|
| 4,552,573 | A * | 11/1985 | Weis | B65G 69/186 141/248 |
| 4,572,782 | A * | 2/1986 | Smith | B07B 1/46 193/3 |
| 6,471,029 | B1 * | 10/2002 | Pierce | B65G 69/0441 193/14 |
| 7,604,447 | B2 * | 10/2009 | Cimenti | B65G 69/0441 414/299 |
| 7,762,290 | B2 | 7/2010 | Schroeder et al. | |
| 7,946,315 | B2 | 5/2011 | Schroeder et al. | |
| 7,946,796 | B2 * | 5/2011 | Halland | B65G 69/0441 414/299 |
| 8,136,556 | B2 | 3/2012 | Schroeder et al. | |
| 8,469,065 | B2 * | 6/2013 | Schroeder | B65G 67/22 141/198 |
| 8,721,230 | B2 * | 5/2014 | Niedworok | B65G 69/0441 406/168 |
| 2003/0121760 | A1 * | 7/2003 | Forrest | B65G 69/0441 198/523 |
| 2013/0048145 | A1 | 2/2013 | Redford | |

\* cited by examiner

PARTICULATE MATERIAL LOADING APPARATUS FOR TRANSPORT CONTAINERS

This application claims the benefit under 35 U.S.C. 119(e) of U.S. provisional application Ser. No. 61/824,516, filed May 17, 2013.

FIELD OF THE INVENTION

The present invention relates to an apparatus and method for loading particulate material into transport containers, for example railcars, and more particularly the present invention relates to an apparatus and method using at least one secondary spout in communication with a main loading spout such that a primary flow of particulate material is discharged downwardly into the transport container from the main loading spout and a secondary flow of the particulate material is discharged into the transport container through the secondary spout(s) in a lateral direction transversely to the longitudinal direction of the main loading spout.

BACKGROUND

Various types of particulate materials, for example dried distillers grains and the like, are conventionally shipped in transport containers such as railcars, truck containers, or containers that may be hauled on a barge or a ship. Such transport containers are commonly loaded through a loading opening in a top side thereof using a main loading spout through which the particulate material is discharged into the container. The discharged particulate materials form piles in the containers having an angle of repose which typically results in voids within upper corners of the containers which are not filled.

Various prior art attempts at optimally distributing materials in containers of various types are disclosed in the following patents: U.S. Pat. No. 232,597 by Coleman, U.S. Pat. No. 3,572,523 by Cymara, U.S. Pat. No. 4,397,423 by Beaver et al, U.S. Pat. No. 7,762,290 by Schroeder et al, U.S. Pat. No. 7,946,315 by Schroeder et al, U.S. Pat. No. 8,136,556 by Schroeder et al, and FR 2 690 676 by Delaunay et al, and in the following US Patent Application Publication No. 2013/0048145. Prior art attempts are either not suitable for use with conventional main loading spouts for top loading railcars and the like, or are complex in construction requiring a motor to drive a rotating member.

SUMMARY OF THE INVENTION

According to one aspect of the present invention there is provided a loading apparatus for loading particulate material into a transport container having a loading opening in a top side thereof using a main loading spout extending in a longitudinal direction and having a discharge opening at a bottom end for discharge particulate material therethrough into the transport container, the apparatus comprising:

at least one secondary spout arranged to communicate with the main loading spout such that:
  a primary flow of the particulate material is arranged to be discharged into the transport container downwardly through the discharge opening in the longitudinal direction of the main loading spout; and
  a secondary flow of the particulate material is arranged to be discharged into the transport container through said at least one secondary spout in a respective lateral direction transversely to the longitudinal direction of the main loading spout.

According to a second aspect of the invention there is provided a method of loading particulate material into a transport container having a loading opening in a top side thereof, the method comprising:

providing a main loading spout extending in a longitudinal direction and having a discharge opening at a bottom end for discharge particulate material therethrough into the transport container;

directing particulate material downwardly through the main loading spout such that:
  a primary flow of the particulate material is discharged into the transport container downwardly through the discharge opening in the longitudinal direction of the main loading spout; and
  a secondary flow of the particulate material is discharged into the transport container in at least one lateral direction transversely to the longitudinal direction of the main loading spout.

The method preferably includes providing at least one secondary spout operably connected with the main loading spout and directing the secondary flow of the particulate material through said at least one secondary spout.

The present invention provides a simple fixed structure using one or more secondary spouts which can direct a secondary flow of particulate material therethrough in a lateral direction transversely to the primary flow from the main loading spout. Accordingly the secondary flow can be used for filling the upper areas of a transport container above the angle of repose of the primary flow for maximizing the capacity of the transport container, thus reducing overall shipping costs for particulate materials. By separating the secondary flow from the primary flow, for example using a branched line, the secondary flow can be accelerated relative to the primary flow to sufficiently throw the material into areas the primary flow cannot adequately fill. Accordingly the primary flow can be directed independently of the accelerated secondary flow so as to minimize dust generated in discharging the primary flow.

Preferably said at least one secondary spout has a respective discharge opening which is arranged to be independent of discharge opening of the main loading spout such that the discharge opening of the main loading spout is unobstructed by said at least one secondary spout.

Preferably said at least one secondary spout comprises two secondary spouts which are directed in opposing lateral directions.

Preferably the two secondary spouts are symmetrical about a central vertical plane such that the two secondary spouts are directed outwardly in opposing lateral directions from the central plane at an angular inclination to the central plane.

Preferably said at least one secondary spout is arranged to direct the secondary flow substantially horizontally into the transport container.

When used with a transport container comprising a railcar extending in a longitudinal direction in which the main loading spout is arranged to be displaced forwardly relative to the railcar in the longitudinal direction of the railcar, preferably said at least one secondary spout is arranged to direct the secondary flow of the particulate material rearwardly into the railcar.

Preferably said at least one secondary spout is arranged to be located forwardly of the discharge opening of the main loading spout.

Preferably said at least one secondary spout comprises a pair of secondary spouts which are directed rearwardly in two opposing lateral directions relative to the main loading spout.

Preferably said at least one secondary spout is arranged to be oriented at approximately 45 degrees from the longitudinal direction of the railcar.

Preferably said at least one secondary spout is arranged to be connected to the main loading spout such that the primary flow of particulate material remains oriented vertically downward.

Preferably said at least one secondary spout is sized relative to the main loading spout such that the secondary flow is arranged to be less than the primary flow. More preferably said at least one secondary spout is sized relative to the main loading spout such that the secondary flow is arranged to be less than 20 percent of an overall combined flow of the primary and secondary flows.

Preferably a substantially vertical passage is located directly above said at least one secondary spout so as to be arranged to accelerate the secondary flow into said at least one secondary spout solely by gravity.

Preferably a branch line is arranged to be operatively connected with the main loading spout upstream from the discharge opening in which said at least one secondary spout is operatively connected with the branch line so as to direct the secondary flow through the branch line and said at least one secondary spout.

Preferably the branch line includes an upper section and a lower section pivotally coupled to one another in which the lower section is arranged to be connected to the main loading spout for pivotal movement of the lower section together with corresponding movement of the main loading spout.

Preferably the lower section of the branch line further includes a first portion and a second portion telescopically coupled to one another in which the second portion is arranged to be connected to the main loading spout for telescoping movement of the second portion together with height adjustment of the discharge opening of the main loading spout.

Preferably the branch line extends substantially vertically between an inlet portion connected to the main loading spout at a top end of the branch line and said at least one secondary spout at the bottom end of the branch line.

When used with a main loading spout including a primary valve controlling flow to discharge opening, preferably the branch line is operatively connected to the main loading spout upstream from the primary valve.

Preferably a valve is provided in series with the branch line which is operable between an open position in which the secondary flow is directed through the branch line and a closed position in which the secondary flow through the branch line is restricted.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a particulate material loading apparatus generally indicated by reference numeral 10. The apparatus 10 is suited for use with a main loading spout 12 for top filling a transport container to minimize voids in the container.

Figure 1:
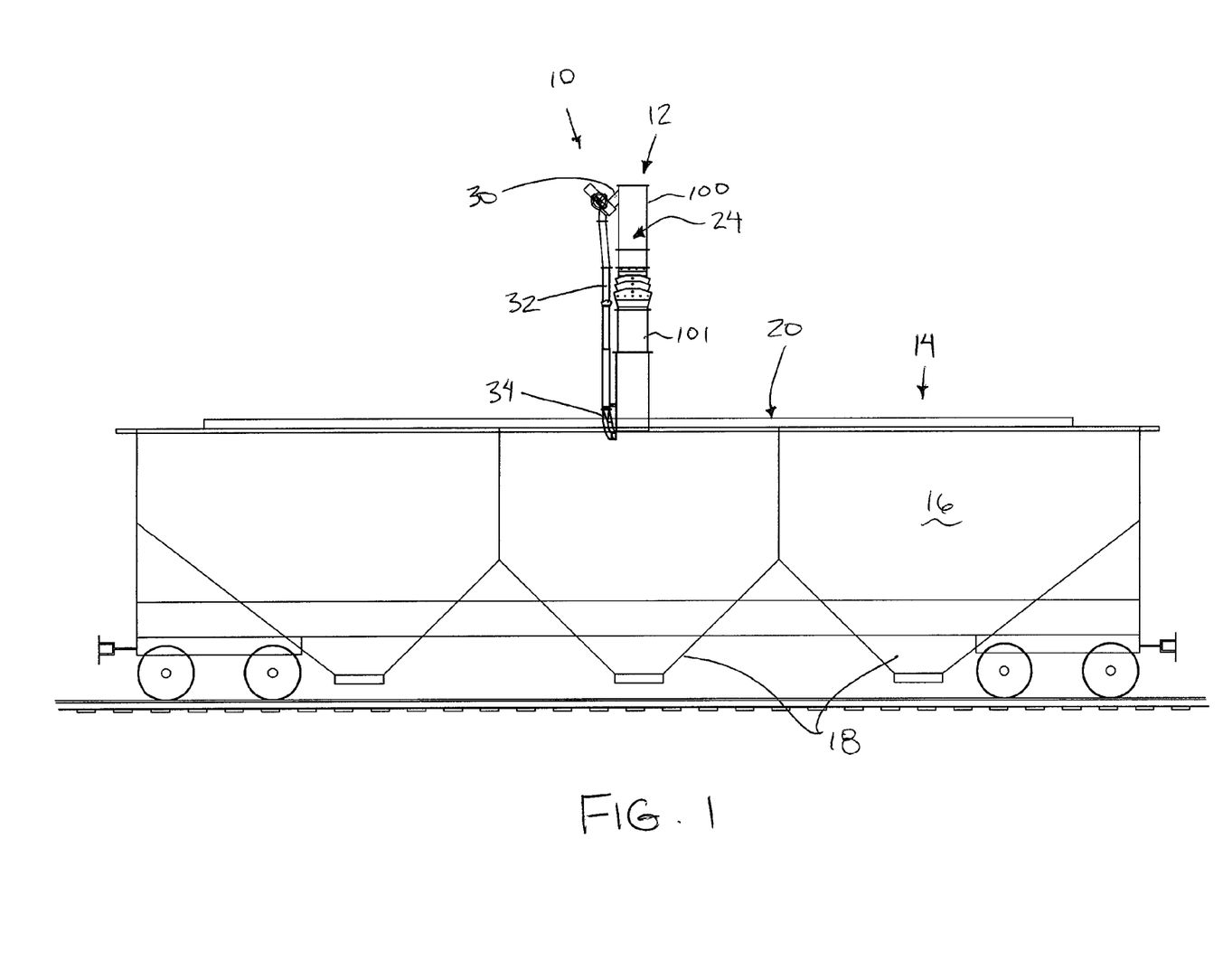
FIG. 1 is a side elevational view of a transport container being loaded with the particulate material loading apparatus according to a first embodiment of the main loading spout.
Figure 2:
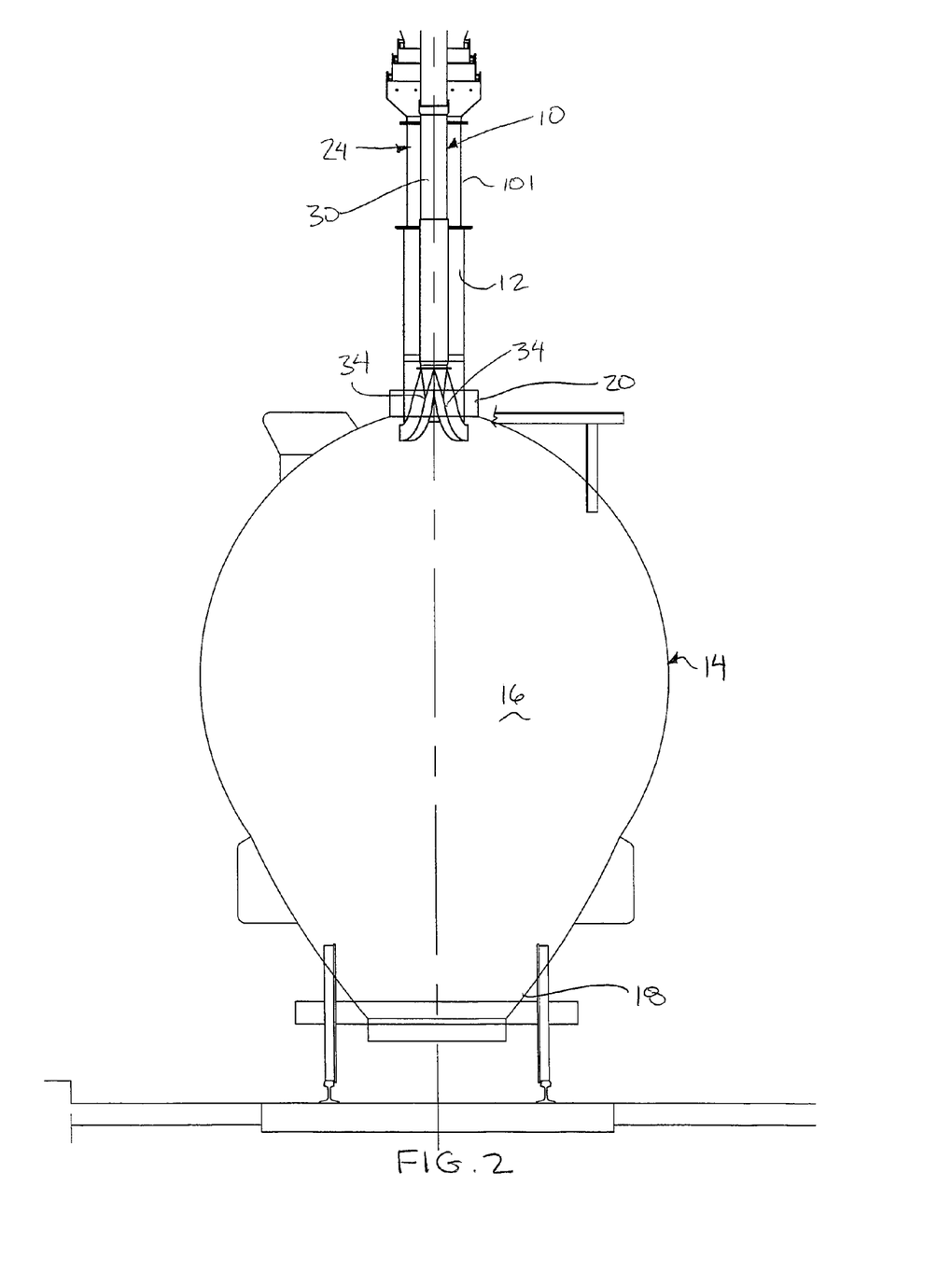
FIG. 2 is an end elevational view of the transport container being loaded with the apparatus according to FIG. 1.
Figure 3:
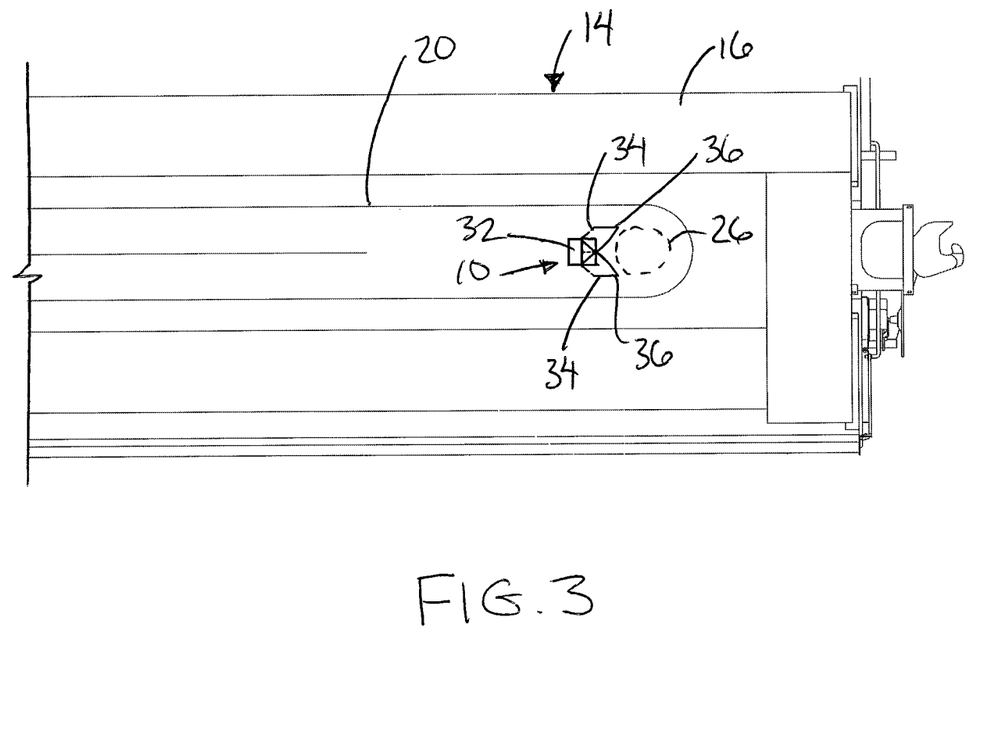
FIG. 3 is a top plan view of the transport container being loaded with the apparatus according to FIG. 1.

The apparatus is particularly suited for loading transport containers such as a railcar 14. A railcar for particulate material typically comprises a tank structure 16 which is elongate in a longitudinal direction. Typically, the tank structure is internally divided into multiple sections joined in series with one another in the longitudinal direction with each section being provided with a respective hopper discharge 18 at the bottom end. The sections of the tank structure may be individually loaded through respective openings, or more preferably a more common loading opening 20 spans all the sections of the tank structure in the longitudinal direction. The loading opening is typically accessible through a suitable hatch structure operable between open and closed positions across the loading opening.

The railcar is typically filled using a main loading spout 12 which may be fed by a hopper or augured materials or which may be fed by a conveyor.

Figure 4:
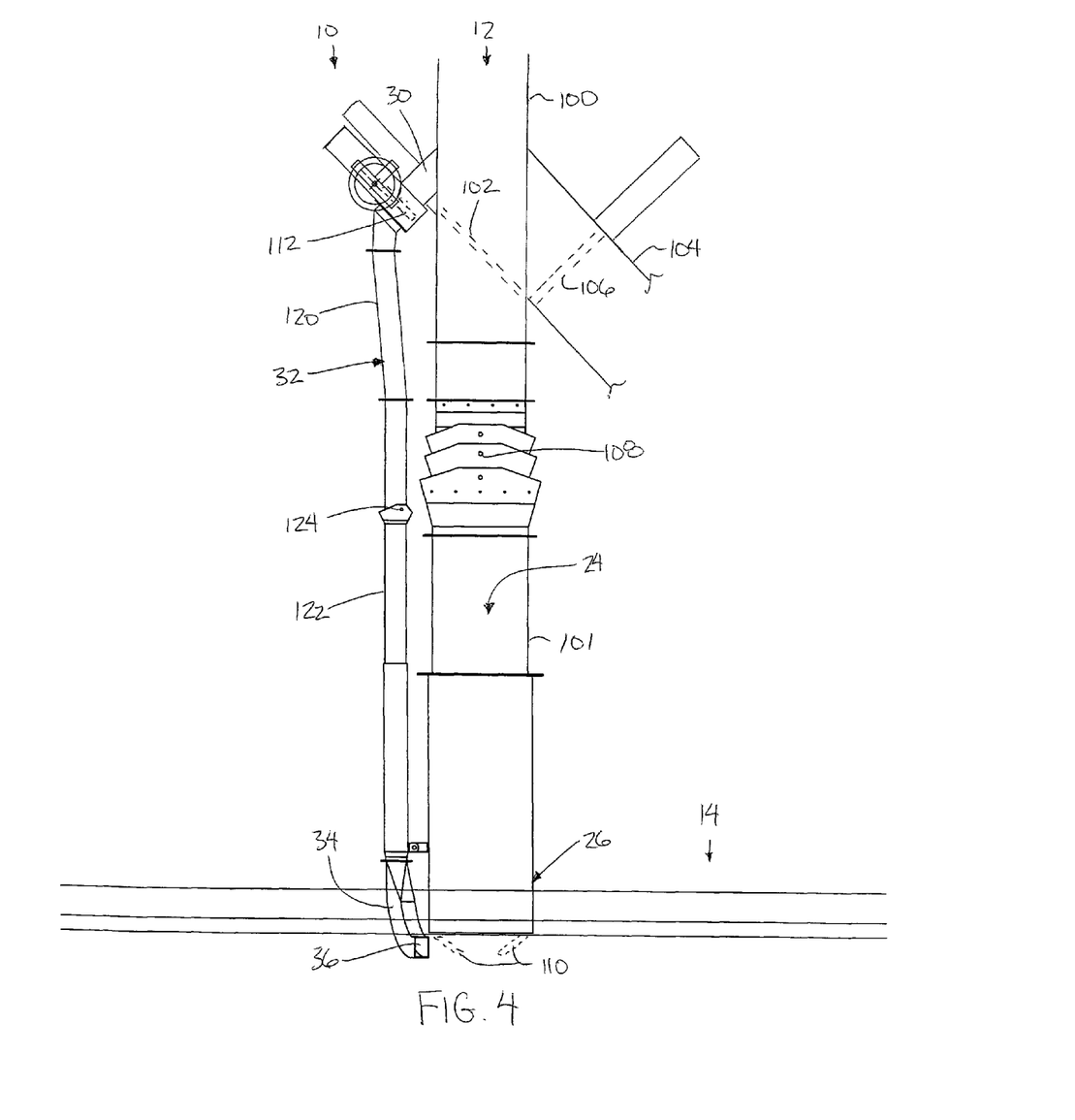
FIG. 4 is an enlarged side elevational view of the apparatus according to FIG. 1.
Figure 5:
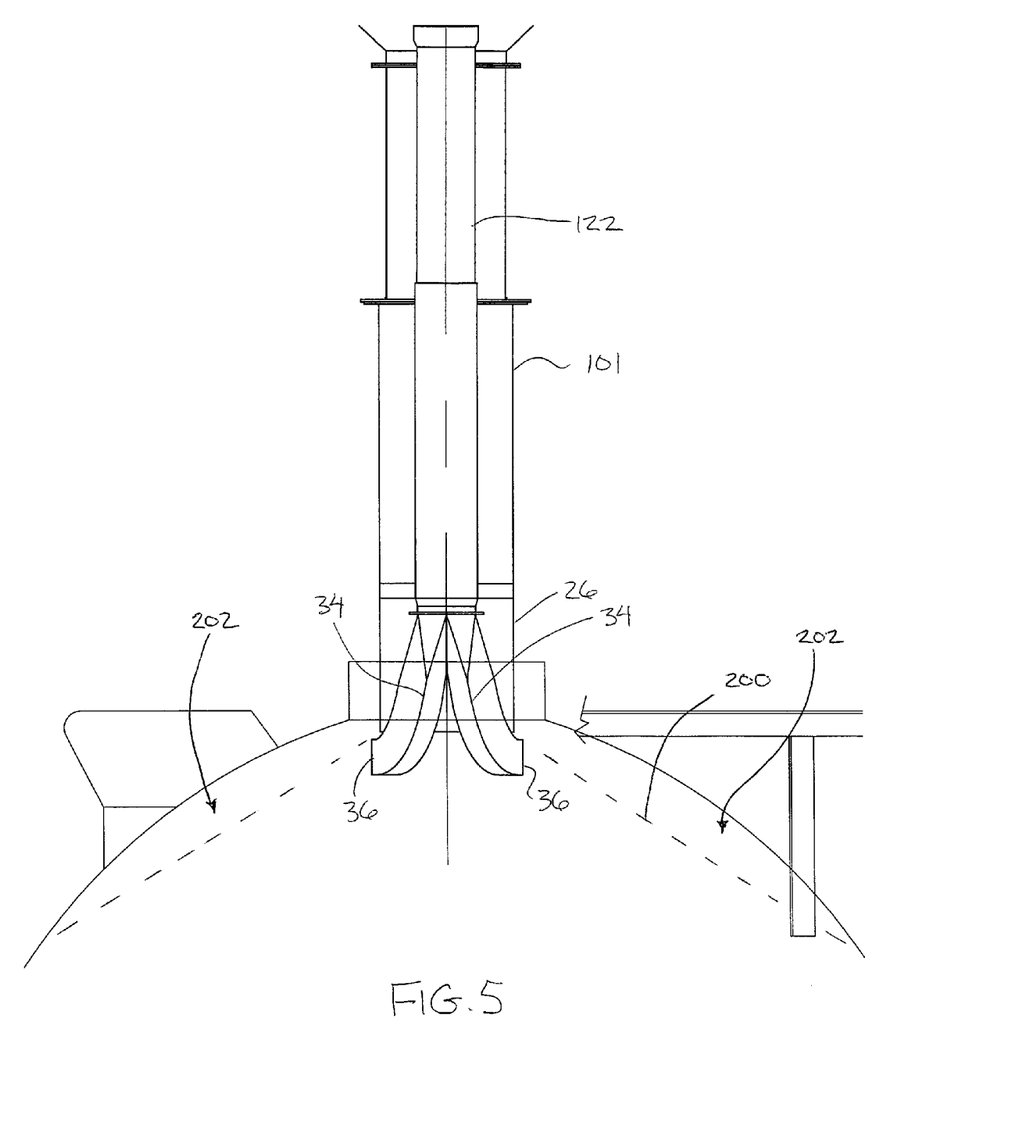
FIG. 5 is an enlarged front elevational view of the apparatus according to FIG. 1.

In each instance, the main loading spout 12 comprises an elongate main tubular passage 24 which extends vertically downward in a longitudinal direction of the loading spout from an inlet section 100 at the top end which receives product from the loading hopper thereabove to discharge section 101 below the inlet section and which locates a discharge nozzle 26 at the bottom end thereof.

A primary gate 102 is provided in the form of a slide gate supported at the inlet section 100 of the main passage. The primary gate 102 is operable between a closed position spanning transversely across the full cross section of the main passage to block flow to the main passage and an open position in which the main passage is substantially unobstructed by the gate to readily permit flow of bulk material therethrough.

A return passage 104 branches off from the inlet section 100 of the main passage at a location above the primary gate 102 to one side of the main passage. A return gate 106 is provided in the form of a slide gate supported at the return passage in close proximity to the main passage. The return gate 106 is operable between a closed position spanning transversely across the full cross section of the return passage to block flow to the return passage and an open position in which the return passage is substantially unobstructed by the gate to readily permit flow of bulk material therethrough.

The top end of the lower discharge section 101 is pivotally coupled to the bottom end of the upper inlet section 100 by a hinged connection 108 to permit the discharge section 101 to swivel about a generally horizontal axis relative to the upper inlet section 101.

The lower discharge section 101 is comprises of a plurality of tubular members coupled for relative telescoping sliding movement to adjust an overall length of the lower discharge section 101 between the top end coupled to the inlet section 100 and the bottom end locating the discharge nozzle 26 thereon. The discharge nozzle 26 is thus mounted for height adjustment relative to the main tubular passage and is permitted to swivel about a generally horizontal axis of the hinged joint to permit the bottom end of the nozzle to be lowered and raised relative to the railcar within which is inserted during a loading operation.

Figure 6:
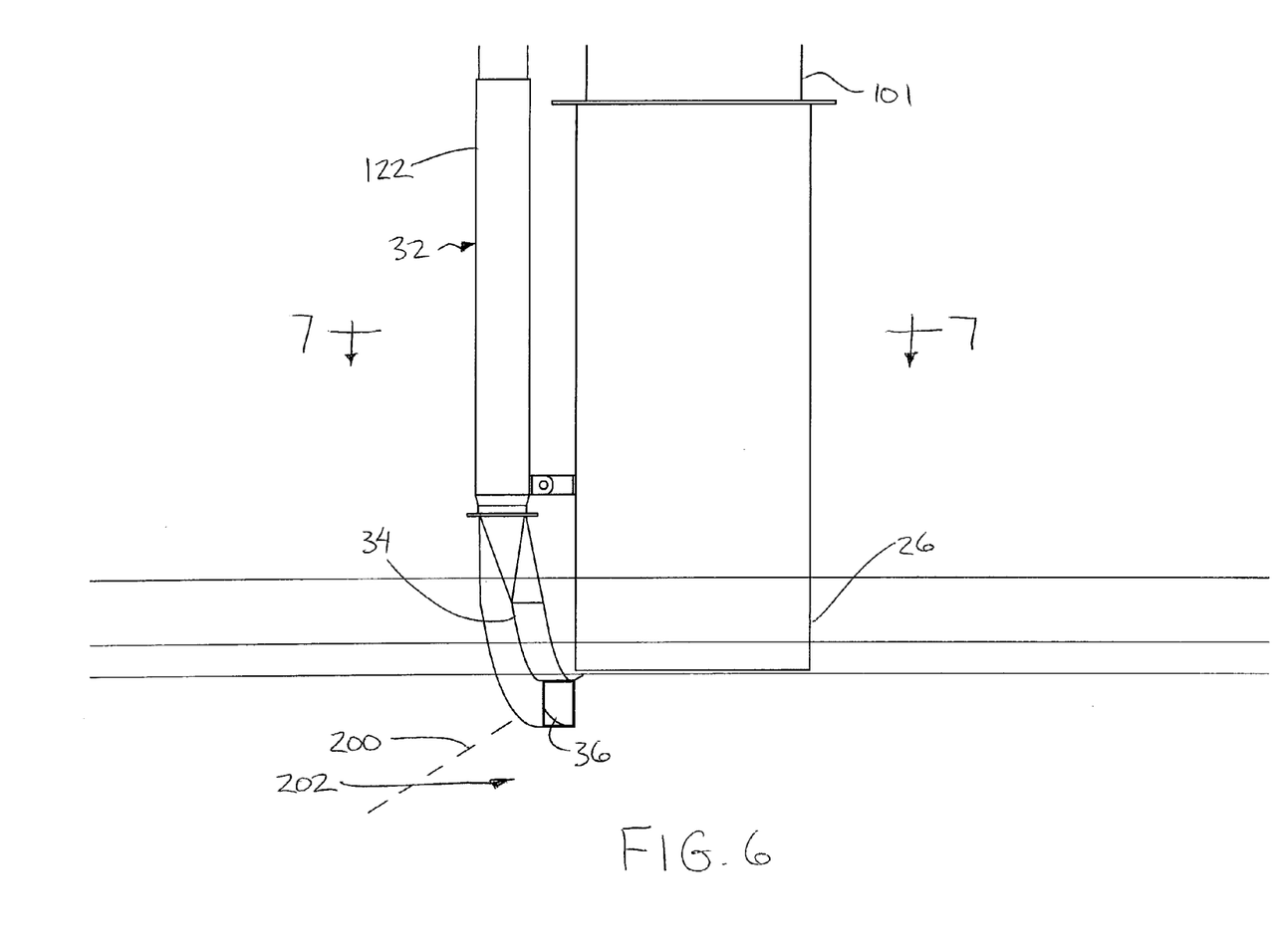
FIG. 6 is a side elevational view of the lower section and secondary spout of the apparatus according to FIG. 1.

The discharge nozzle 26 defines a discharge opening at the bottom end thereof such that a primary flow of particulate material from the main spout is arranged to be discharged vertically downward through the discharge opening at the bottom end of the main loading spout. Discharge flaps 110 are provided at the discharge opening of the discharge nozzle which are spring biased to partially span across the opening, but which are automatically deflected away from the opening to an open position under the weight of bulk material falling through the main passage onto the flaps. The flaps assist in controlling or limiting dispersal of dust from the bulk material being dispensed.

When loading a railcar, the spout is typically initially aligned with one end of the loading opening 20. As the first end of the railcar is filled, the railcar is then longitudinally displaced to advance the spout forwardly in the longitudinal direction relative to the railcar as material is continued to be discharged from the spout to fill the length of the railcar.

The apparatus 10 is arranged to be coupled to the main loading spout to redirect a secondary flow of the particulate material such that the secondary flow is discharged into the transport container independently of the primary flow and in at least one lateral direction transverse to the vertical flow of particulate material in the primary flow exiting the discharge opening of the main spout.

The apparatus 10 includes an inlet portion 30 in communication with the inlet section 100 of the main tubular passage 24 of the main loading spout at a location spaced longitudinally upstream from the primary gate 102. The inlet portion 30 may include a scoop, baffle or other suitable diverter structure which protrudes inwardly into the interior diameter of the main tubular passage 24 to redirect the secondary flow of particulate material from the main tubular passage 24 to a separate branch line 32 connected to the inlet portion which defines a secondary passage therethrough. More preferably, the flow of bulk material through the main passage is sufficiently restricted by the primary gate 102 that some of the bulk material within the inlet section above the primary gate 102 will naturally fall offset to one side into the inlet portion 30 of the loading apparatus 10.

The inlet portion 30 of the loading apparatus further includes a secondary gate 112 supported therein in the form of a slide gate supported at the secondary passage in close proximity to the main passage. The secondary gate 112 is operable between a closed position spanning transversely across the full cross section of the secondary passage to block flow to the secondary passage and an open position in which the secondary passage is substantially unobstructed by the gate to readily permit flow of bulk material therethrough.

The branch line 32 is an elongate tubular passage which extends vertically downward alongside and parallel to the main tubular passage 24 between the inlet portion 30 at the top end thereof and a bottom end of the branch line which supports a pair of secondary spouts 34 thereon.

The branch line 32 includes: i) an upper section 120 spanning alongside the inlet section of the main passage between the inlet portion 30 and a bottom end at a common elevation with the hinged connection 108 of the main passage, ii) a lower section 122 spanning alongside the lower discharge section 101 between from the bottom end of the upper section 120 to a bottom end in proximity to the bottom end of the main passage, and iii) a hinged connection 124 forming a hinged joint between the bottom end of the upper section 120 and the top end of the lower section 122. The hinged connection defines a horizontal pivot axis of the lower section relative to the upper section which is near in elevation to the pivot axis of the main passage.

The lower section 122 includes an upper and lower telescoping portions which telescopically slidable relative to one another and which permit the length of the lower section of the branch line to be adjusted similarly to the main passage. The bottom end of the lower section 122 is coupled to the lower discharge section of the main passage so that the secondary spouts at the bottom end of the branch line and the discharge nozzle at the bottom end of the main passage are generally movable together for pivoting movement about their respective horizontal pivot axis and for vertical movement by telescoping movement of their respective lower sections. Accordingly the height of the secondary spouts at the bottom end of the lower section 122 of the branch line are adjustable together with the height adjustment of the main spout relative to the railcar being loaded.

In this manner, the secondary spouts 34 can be lowered downwardly into the railcar through the loading opening at the top end thereof together with the discharge nozzle at the bottom end of the main loading spout. During discharging, the secondary spouts 34 are typically positioned at substantially the same height as the discharge opening at the bottom end of the main loading spout. The branch line 32 and the secondary spouts 34 are typically positioned at the forward side of the main loading spout in relation to the railcar being loaded.

Figure 7:
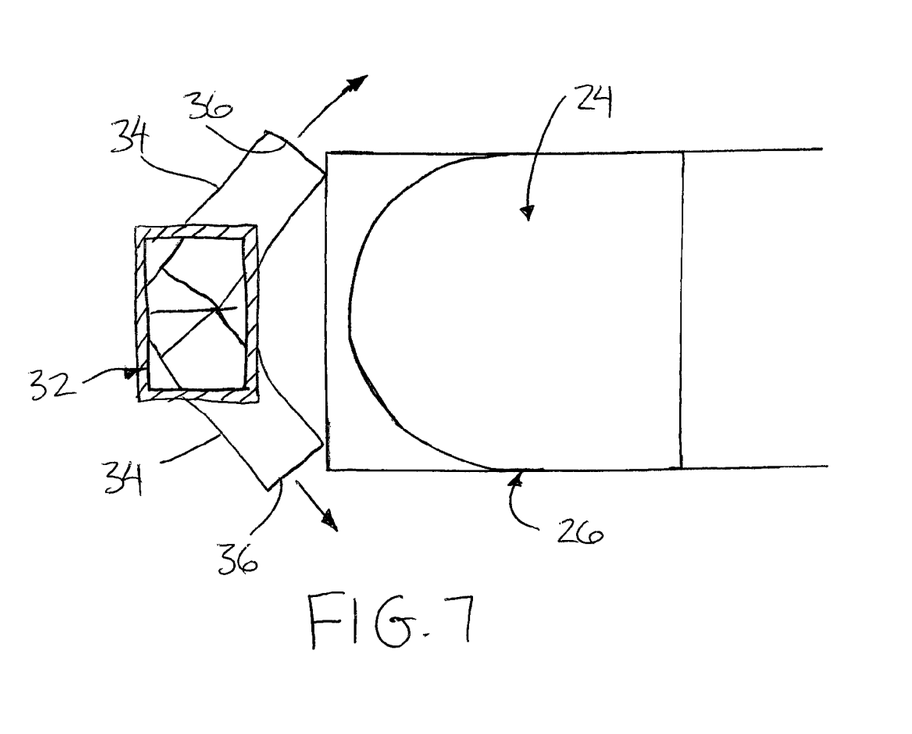
FIG. 7 is a sectional view along the line 7-7 of FIG. 6.

The secondary spouts 34 each define a respective passage in the form of a curved trough or a nozzle communicating from the bottom end of the branch line to a respective free end 36. The free ends 36 define respective discharge openings of the secondary spouts respectively. The free ends are oriented so as to direct material flowing through the secondary spouts in two opposing lateral directions relative to a central vertical plane oriented in the longitudinal direction of the railcar. Furthermore, each secondary spout is oriented to direct material exiting therefrom at a near horizontal elevation or at a slight upward inclination from a horizontal plane within a range of a few degrees. Furthermore, the two spouts are each directed generally rearwardly relative to the railcar at an inclination to the longitudinal direction of the railcar. In the illustrated embodiment, the two secondary spouts are oriented at 45 degrees from the longitudinal direction of the railcar so as to be inclined rearwardly and laterally outwardly from the central vertical plane and so as to be transverse to the vertically downward direction of the primary flow exiting the discharge opening of the main loading spout.

Typically, the secondary flow is arranged to be much smaller than the primary flow. For example, the secondary flow is preferably in the range of 10-15 percent in volume that of the combined primary and secondary flows together. The rate of the secondary flow can be adjusted relative to the primary flow using the primary and secondary gates or other suitable valve member in operation within the inlet portion 30 between the main passage and the branch line. More particularly, the secondary gate can be operable between open and closed positions such that in the closed position the secondary flow is interrupted and prevented, but in the open position, the secondary flow through the branch line is unrestricted. The gates can also be operated at any number of intermediate positions between the open and closed positions depending upon the desired rate of the secondary flow relative to the primary flow.

The branch line 32 extends a considerable height, for example in the range of 14-16 feet in the vertical direction to sufficiently accelerate the secondary flow in the branch line directed to the secondary spouts that the velocity of the particulate material flowing through the secondary spouts permits the particulate material to be thrown rearwardly and laterally outwardly at opposing sides of the primary flow through the main discharge spout. The secondary passage is substantially vertical and unrestricted along the length thereof between the inlet portion 30 at the top and the secondary spouts at the bottom such that the second flow through the branch line 32 can be accelerated solely under force of gravity with satisfactory results.

In use, a railcar is initially aligned so that the spout can be lowered into the loading opening at one end thereof and the branch line 32 is telescopically lowered together with the main discharge spout at a location immediately forwardly of the main spout so that the secondary spouts at the bottom end thereof are also inserted into the railcar through the top loading opening.

Particulate bulk material is directed downwardly through the main loading spout and the gates are adjusted to redirect a portion of the particulate material downwardly through the branch line which defines the secondary flow. The remainder of flow in the main loading spout downstream from the communication of the branch line 32 defines the primary flow of particulate material which is then discharged through the discharge opening at the bottom end of the main loading spout.

The material deposited in the primary flow typically forms a primary pile 100, while the material discharged from the secondary spout is directed rearwardly onto laterally opposing sides of the primary pile to substantially fill voids 102 above the angle of repose of the primary pile. As the area immediately about the main loading spout has been filled, the railcar can be longitudinally displaced such that the main loading spout and the secondary spouts adjacent thereto are advanced together relative to the railcar in the forward direction towards the other end of the railcar while material continues to be discharged through the spouts.

In some instances, level sensors may be provided to advance the car only when the shoulders in the upper corners of the railcar above the angle of repose of the primary pile have been substantially filled. When the spout reaches the opposing end of the railcar and the railcar has been substantially filled, both primary and secondary flows are interrupted and the spouts can be all lifted upwardly out of the railcar before being subsequently lowered into the next railcar of the advancing row of railcars to fill the next railcar in a similar fashion.

Since various modifications can be made in my invention as herein above described, it is intended that all matter contained in the accompanying specification shall be interpreted as illustrative only and not in a limiting sense.

The invention claimed is:

1. A loading apparatus for loading particulate material into a transport container having a loading opening in a top side thereof, the apparatus comprising:
   a main loading spout having a main tubular passage extending vertically in a longitudinal direction from an inlet section for receiving a particulate material to be loaded into the transport container to a discharge opening at a bottom end adapted to discharge a primary flow of the particulate material downwardly therethrough in the longitudinal direction of the main tubular passage into the transport container;
   a branch line extending longitudinally alongside the main tubular passage of the main loading spout between an inlet portion operatively connected to the inlet section of the main loading spout and a bottom end of the branch line so as to be arranged to receive a secondary flow of the particulate material therethrough which is separated from the primary flow of the particulate material; and
   at least one secondary spout coupled to the bottom end of the branch line such that the secondary flow of the particulate material from the branch line is arranged to be discharged into the transport container through said at least one secondary spout in a respective lateral direction transversely to the longitudinal direction of the main loading spout.

2. The apparatus according to claim 1 wherein said at least one secondary spout has a respective discharge opening which is in proximity to the discharge opening of the main loading spout such that the discharge opening of the main loading spout is unobstructed by said at least one secondary spout.

3. The apparatus according to claim 1 wherein said at least one secondary spout comprises two secondary spouts which are directed in opposing lateral directions.

4. The apparatus according to claim 3 wherein the two secondary spouts are symmetrical about a central vertical plane such that the two secondary spouts are directed outwardly in opposing lateral directions from the central plane at an angular inclination to the central plane.

5. The apparatus according to claim 1 wherein said at least one secondary spout is arranged to direct the secondary flow substantially horizontally into the transport container.

6. The apparatus according to claim 1 for use with a transport container comprising a railcar extending in a longitudinal direction in which the main loading spout is arranged to be displaced forwardly relative to the railcar in the longitudinal direction of the railcar, wherein said at least one secondary spout is arranged to direct the secondary flow of the particulate material rearwardly into the railcar.

7. The apparatus according to claim 6 wherein said at least one secondary spout is arranged to be located forwardly of the discharge opening of the main loading spout.

8. The apparatus according to claim 6 wherein said at least one secondary spout comprises a pair of secondary spouts which are directed rearwardly in two opposing lateral directions relative to the main loading spout.

9. The apparatus according to claim 6 wherein said at least one secondary spout is arranged to be oriented at approximately 45 degrees from the longitudinal direction of the railcar.

10. The apparatus according to claim 1 wherein the branch line is connected to the main loading spout such that the primary flow of particulate material remains oriented vertically downward.

11. The apparatus according to claim 1 wherein said at least one secondary spout is sized relative to the main loading spout such that the secondary flow is arranged to be less than the primary flow.

12. The apparatus according to claim 1 wherein said at least one secondary spout is sized relative to the main loading spout such that the secondary flow is arranged to be less than 20 percent of an overall combined flow of the primary and secondary flows.

13. The apparatus according to claim 1 wherein the branch line defines a vertical passage directly above said at least one secondary spout so as to be arranged to accelerate the secondary flow into said at least one secondary spout by gravity.

14. The apparatus according to claim 1 wherein the branch line includes an upper section and a lower section pivotally coupled to one another in which the lower section is arranged to be connected to the main loading spout for pivotal movement of the lower section together with corresponding movement of the main loading spout.

15. The apparatus according to claim 1 wherein the branch line includes a first portion and a second portion telescopically coupled to one another in which the second portion is arranged to be connected to the main loading spout for telescoping movement of the second portion together with height adjustment of the discharge opening of the main loading spout.

16. The apparatus according to 1 wherein the main loading spout includes a primary valve controlling flow to the discharge opening, and wherein the branch line is operatively connected to the main loading spout upstream from the primary valve.

17. The apparatus according to claim 1 further comprising a valve in series with the branch line which is operable between an open position in which the secondary flow is directed through the branch line and a closed position in which the secondary flow through the branch line is restricted.

18. A loading apparatus for loading particulate material into a transport container having a loading opening in a top side thereof using a main loading spout extending in a longitudinal direction and having a discharge opening at a bottom end for discharge particulate material therethrough into the transport container, the apparatus comprising:
  a branch line adapted to be operatively connected with the main loading spout upstream from the discharge opening;
  at least one secondary spout arranged to be operatively connected with the branch line such that:
    a primary flow of the particulate material is arranged to be discharged into the transport container downwardly through the discharge opening in the longitudinal direction of the main loading spout; and
    a secondary flow of the particulate material is arranged to be directed through the branch line and discharged into the transport container through said at least one secondary spout in a respective lateral direction transversely to the longitudinal direction of the main loading spout;
  wherein the branch line includes an upper section and a lower section pivotally coupled to one another in which the lower section is arranged to be connected to the main loading spout for pivotal movement of the lower section together with corresponding movement of the discharge opening of the main loading spout.

19. A loading apparatus for loading particulate material into a transport container having a loading opening in a top side thereof using a main loading spout extending in a longitudinal direction and having a discharge opening at a bottom end for discharge particulate material therethrough into the transport container, the apparatus comprising:
  a branch line adapted to be operatively connected with the main loading spout upstream from the discharge opening;
  at least one secondary spout arranged to be operatively connected with the branch line such that:
    a primary flow of the particulate material is arranged to be discharged into the transport container downwardly through the discharge opening in the longitudinal direction of the main loading spout; and
    a secondary flow of the particulate material is arranged to be directed through the branch line and discharged into the transport container through said at least one secondary spout in a respective lateral direction transversely to the longitudinal direction of the main loading spout;
  wherein the branch line includes a first portion and a second portion telescopically coupled to one another in which the second portion is arranged to be connected to the main loading spout for telescoping movement of the second portion together with height adjustment of the discharge opening of the main loading spout.

* * * * *